United States Patent
Nakamura et al.

(10) Patent No.: US 12,398,286 B2
(45) Date of Patent: Aug. 26, 2025

(54) IMAGE FORMING METHOD AND INK SET

(71) Applicant: Konica Minolta, Inc., Tokyo (JP)

(72) Inventors: Masaki Nakamura, Tokyo (JP);
Masaharu Shiraishi, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 242 days.

(21) Appl. No.: 18/323,676

(22) Filed: May 25, 2023

(65) Prior Publication Data

US 2023/0392034 A1 Dec. 7, 2023

(30) Foreign Application Priority Data

Jun. 7, 2022 (JP) ................. 2022-092478

(51) Int. Cl.

| | | |
|---|---|---|
| *C09D 11/54* | (2014.01) | |
| *B41J 2/01* | (2006.01) | |
| *B41J 2/21* | (2006.01) | |
| *C09D 11/322* | (2014.01) | |
| *C09D 11/40* | (2014.01) | |
| *D06H 1/02* | (2006.01) | |
| *D06P 3/82* | (2006.01) | |
| *D06P 5/30* | (2006.01) | |

(52) U.S. Cl.
CPC ............... *C09D 11/54* (2013.01); *B41J 2/01* (2013.01); *B41J 2/2107* (2013.01); *B41J 2/2114* (2013.01); *C09D 11/322* (2013.01); *C09D 11/40* (2013.01); *D06H 1/02* (2013.01); *D06P 3/82* (2013.01); *D06P 5/30* (2013.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033; B41M 5/0011; B41M 5/0017; B41M 5/0023; B41M 5/0047; B41M 7/00; B41M 7/0072; B41M 5/52; B41M 5/5218; B41M 5/5227
See application file for complete search history.

(56) References Cited

U.S. PATENT DOCUMENTS

| | | | | |
|---|---|---|---|---|
| 6,283,589 | B1 * | 9/2001 | Gelbart ..................... | B41J 2/01 347/100 |
| 11,607,900 | B2 * | 3/2023 | Wakao ....................... | B41J 2/01 |
| 11,692,303 | B2 * | 7/2023 | Nito ........................... | D06P 5/30 347/100 |
| 2013/0201252 | A1 * | 8/2013 | Namba ................ | C09D 11/322 347/21 |
| 2014/0141212 | A1 * | 5/2014 | Fu ........................ | B41M 7/0027 347/17 |
| 2015/0054885 | A1 * | 2/2015 | Sugiyama ................ | D06P 1/525 347/21 |
| 2016/0177116 | A1 * | 6/2016 | Katsuragi ............... | B41J 2/2107 347/102 |
| 2020/0048486 | A1 * | 2/2020 | Nio ......................... | C09D 11/38 |
| 2020/0317942 | A1 * | 10/2020 | Yamada ................ | C09D 11/322 |
| 2020/0317944 | A1 * | 10/2020 | Fukagawa ............. | C09D 11/322 |
| 2020/0377747 | A1 * | 12/2020 | Sakaguchi ........... | C09D 11/322 |

(Continued)

FOREIGN PATENT DOCUMENTS

| | | |
|---|---|---|
| JP | 2013-221141 A | 10/2013 |
| JP | 2021-085128 A | 6/2021 |
| JP | 2021-098796 A | 7/2021 |

OTHER PUBLICATIONS

Mshuo Guo, et al, A combined molecular dynamics simulation and experimental method to study the compatibility between elastomers and resins, RSC. Adv., vol. 8, No. 26, Apr. 2018, pp. 14401-14413.
Chin Hao Mah, et al, Effect of nature of chemical crosslinker on swelling and solubility parameter of a new stimuli-responsive cationic poly(N-acryloyl-N'-propyl piperazine) hydrogel, Polymer Bulletin, vol. 75, No. 1, Apr. 2017, pp. 221-238.
Extended European Search Report dated Nov. 6, 2023 for corresponding European Patent Application No. 23175968.9.

*Primary Examiner* — Manish S Shah
(74) *Attorney, Agent, or Firm* — LUCAS & MERCANTI, LLP

(57) ABSTRACT

An image forming method includes: applying an ink containing a pigment and resin particles onto a fabric by an inkjet method; and applying a post-treatment liquid containing a lubricant onto the ink applied to the fabric in a wet-on-wet manner, wherein when a solubility parameter of a resin constituting the resin particles is represented by $SP_1$ $(cal/cm^3)^{1/2}$ and a solubility parameter of the lubricant is represented by $SP_2$ $(cal/cm^3)^{1/2}$, $0.3 \leq SP_1 - SP_2 \leq 0.8$ is satisfied.

13 Claims, No Drawings

(56) References Cited

U.S. PATENT DOCUMENTS

| | | | |
|---|---|---|---|
| 2021/0198512 A1* | 7/2021 | Nakao | C09D 11/40 |
| 2021/0292582 A1* | 9/2021 | Hanazawa | C09D 11/107 |
| 2022/0169875 A1* | 6/2022 | Maruyama | D06P 5/002 |
| 2023/0095396 A1* | 3/2023 | Bar | C09D 11/40 |
| | | | 347/100 |

* cited by examiner

IMAGE FORMING METHOD AND INK SET

The entire disclosure of Japanese patent Application No. 2022-092478, filed on Jun. 7, 2022, is incorporated herein by reference in its entirety.

BACKGROUND

Technological Field

The present invention relates to an image forming method and an ink set.

Description of the Related Art

As a textile printing method, exhaustive textile printing is conventionally known in which textile printing is performed by immersing a fabric in a bath filled with a dye, but since dyeing takes a long time, production efficiency is low. In recent years, so-called inkjet textile printing has been widely performed in which an image is formed on a fabric by an inkjet method because dyeing can be performed in a short time, production efficiency is high, and the like.

In inkjet textile printing, ink microdroplets are discharged from an inkjet recording head and landed on a fabric to form an image. As an ink used in inkjet textile printing, a dye ink is mainly used, but use of a pigment ink capable of omitting a post-treatment such as a washing step of washing away a dye that has not been dissolved or reacted has been studied.

The pigment ink exhibits high color developability by causing pigment particles to be retained on a surface of a fabric, but has lower fixability of the pigment particles and tends to have poorer friction fastness than the dye ink. Therefore, studies have been made to enhance the fixability of the pigment particles and to enhance the friction fastness by adding a binder resin (resin particles) to the ink or applying a post-treatment liquid onto the ink.

For example, JP 2021-85128 A discloses an inkjet textile printing method including a step of inkjet-applying an ink composition to a fabric containing a first treatment agent containing a cationic substance and a step of applying a second treatment agent containing resin particles and a lubricant to the fabric. In Examples, an ink composition containing a pigment and a urethane resin, and a second treatment agent containing an acrylic resin and a silicone-based wax are disclosed.

JP 2021-98796 A discloses an inkjet textile printing method including: a step of causing a treatment liquid containing a polyvalent metal salt to adhere to a fabric to obtain a treated fabric; a step of applying a white ink composition to the treated fabric by an inkjet method to obtain a textile printing fabric; and a step of drying the textile printing fabric. In addition, JP 2021-98796 A discloses that the white ink composition contains a resin having a silicone group as a first fixing resin, and contains a urethane resin, a polyester resin, or an acrylic resin as a second fixing resin.

JP 2013-221141 A discloses an ink set containing a color ink containing a coloring material and an overcoat liquid containing a polyester resin and a lubricant but not containing a coloring material. In Examples, it is disclosed that inkjet textile printing is performed using an ink containing a urethane resin or a polyester resin, and an overcoat liquid containing a urethane resin or a polyester resin and a polyethylene wax.

In JP 2021-85128 A, an ink is applied onto a fabric by inkjet and then dried, and a post-treatment liquid is applied thereto (wet on-dry application). However, in an obtained image-formed product, an interface is easily formed between the ink layer and the post-treatment layer, and the entire post-treatment layer is easily peeled off by friction. Therefore, it has been difficult to maintain friction fastness for a long period of time.

Meanwhile, JP 2013-221141 A describes that ink application by inkjet and overcoat liquid application may be performed simultaneously (wet-on-wet application). In this case, an interface is hardly formed between the ink layer and the overcoat layer, and the overcoat layer is hardly peeled off by friction. However, since affinity between resin particles contained in the ink and a lubricant contained in the overcoat liquid is low, the lubricant easily diffuses to a surface of a fabric in a short time, and it is difficult to maintain friction fastness for a long period of time.

In JP 2021-98796 A, an ink containing two types of resin particles is applied onto a fabric, but a post-treatment liquid is not applied thereto. Therefore, immediately after the ink is applied onto the fabric, the resin particles easily permeate the fabric, and texture of the fabric is easily impaired.

SUMMARY

The present invention has been made in view of the above circumstances, and an object thereof is to provide an image forming method and an ink set capable of maintaining high friction fastness for a long period of time without impairing texture of a fabric.

To achieve the abovementioned object, according to an aspect of the present invention, an image forming method reflecting one aspect of the present invention comprises: applying an ink containing a pigment and resin particles onto a fabric by an inkjet method; and applying a post-treatment liquid containing a lubricant onto the ink applied to the fabric in a wet-on-wet manner, wherein when a solubility parameter of a resin constituting the resin particles is represented by $SP_1$ $(cal/cm^3)^{1/2}$ and a solubility parameter of the lubricant is represented by $SP_2$ $(cal/cm^3)^{1/2}$, $0.3 \leq SP_1 - SP_2 \leq 0.8$ is satisfied.

DETAILED DESCRIPTION OF EMBODIMENTS

Hereinafter, one or more embodiments of the present invention will be described with reference to the drawings. However, the scope of the invention is not limited to the disclosed embodiments.

As a result of intensive studies on the above problems, the present inventors have found that 1) a post-treatment liquid is applied in a wet-on-wet manner, and 2) by moderately increasing affinity between resin particles contained in an ink and a lubricant contained in the post-treatment liquid, friction fastness can be maintained for a long period of time without impairing texture of a fabric.

Regarding 1)

Applying a post-treatment liquid in a wet-on-wet manner means applying the post-treatment liquid before most of droplets of an ink applied previously are completely dried. Specifically, it means that (remaining amount of ink at the time of applying post-treatment liquid)/(adhesion amount of ink) is 0.40 to 1.0, preferably 0.50 to 1.0, more preferably 0.70 to 1.0, and still more preferably 0.80 to 1.0 per unit area of a recording region. Here, "remaining amount of ink at the time of applying post-treatment liquid" refers to the amount of liquid ink remaining without being dried. The remaining amount can be adjusted by appropriately adjusting various conditions such as time from application of the ink to application of the post-treatment liquid.

By applying the post-treatment liquid in a wet-on-wet manner, an interface is hardly formed between the ink and the post-treatment liquid, and a composition change in a thickness direction can be continuous. As a result, it is possible to suppress a phenomenon that the entire post-treatment layer is peeled off by friction. As a result, an effect of slipperiness by a lubricant can be maintained, and therefore friction fastness can be maintained for a long period of time. In addition, by applying the post-treatment liquid in a wet-on-wet manner, the ink and the post-treatment liquid are mixed, and a liquid component such as water or a solvent that easily permeates a fabric relatively increases. Therefore, permeation of the resin particles into a space between fibers is reduced, and the resin particles easily remain on a fiber surface. As a result, the fabric hardly becomes hard, and texture thereof can be favorably maintained Regarding 2)

In addition, the resin particles and the lubricant are selected such that $0.3 \leq SP_1 - SP_2 \leq 0.8$ is satisfied when a solubility parameter of a resin constituting the resin particles contained in the ink is represented by $SP_1$, $(cal/cm^3)^{1/2}$ and a solubility parameter of the lubricant contained in the post-treatment liquid is represented by $SP_2$ $(cal/cm^3)^{1/2}$.

As described above, when the post-treatment liquid is applied in a wet-on-wet manner, the post-treatment liquid is mixed with the ink. Here, when a difference $SP_1 - SP_2$ (hereinafter, also referred to as "ΔSP") between the solubility parameter of the resin particles contained in the ink and the solubility parameter of the lubricant contained in the post-treatment liquid is too large, affinity between the resin particles and the lubricant is low. Therefore, the lubricant instantaneously diffuses to a surface of a continuous layer formed by the ink and the post-treatment liquid easily (diffusion rate is high). As a result, when the surface of the continuous layer is worn, the lubricant is easily lost at an early stage, and it is difficult to maintain friction fastness. Meanwhile, when ΔSP is too small, affinity between the resin particles and the lubricant is too high (diffusion rate of the lubricant is too low). Therefore, the lubricant hardly diffuses to the surface of the continuous layer. As a result, even when the surface of the continuous layer is worn, the lubricant is hardly exposed to the surface, and friction fastness is hardly maintained.

On the other hand, in the present invention, by adjusting ΔSP within the above range, that is, by moderately reducing ΔSP, the diffusion rate of the lubricant to the surface of the continuous layer, that is, a precipitation rate thereof over time can be adjusted. As a result, friction fastness can be maintained for a long period of time. The ΔSP is more preferably 0.4 to 0.7 from a similar viewpoint.

Note that, when the resin particle is a composite particle such as a core-shell particle having a core layer and a shell layer, the solubility parameter $SP_1$ means a solubility parameter of a resin component having the highest weight ratio from a viewpoint of continuation of the resin in a coating film. When two or more types of resin particles are contained, the solubility parameter $SP_1$ means a solubility parameter of a resin particle having the highest weight ratio.

The post-treatment liquid may also contain resin particles. Note that a difference between a solubility parameter of the resin particles contained in the post-treatment liquid and the solubility parameter of the lubricant only needs to be 0.3 to 2.0. This is because the lubricant in the post-treatment layer is desired to quickly diffuse to a surface from a viewpoint of improving short-term dry friction resistance.

The solubility parameter is also called a solubility parameter. As for the solubility parameter $SP_1$ of the resin particles in the present invention, a swelling degree with a known liquid is measured, and a solubility parameter when the swelling degree is the highest is taken as a solubility parameter of the resin particles. Specifically, a swelling degree of a solvent whose solubility parameter is known is measured by the following procedure, and an SP value is specified therefrom.

1) A swelling degree when the resin particles are immersed in a solvent whose solubility parameter is known (five types of solvents: hexane, toluene, ethyl acetate, acetone, and methanol) is measured. In the measurement of the swelling degree, the weight of the dry resin particles is represented by W1, and the weight of the resin particles after the resin particles are immersed in each of the 100% solvents at room temperature for 60 minutes is represented by W2. Then, the swelling degree is calculated using the following formula.

$$\text{Swelling degree } (\%) = (W2 - W1)/W1 \times 100$$

2) Subsequently, a graph is created in which an X axis represents an SP value of a solvent and a Y axis represents a swelling degree, and an approximate curve is drawn. The approximate curve is determined by Gaussian approximation (normal distribution approximation). As an SP value of a solvent, a value of "Fundamentals and Engineering of Coating, written by Yuji Harasaki, p. 53, Converting Technical Institute, 2010" is used.

3) An X axis value at a vertex of the approximate curve obtained in the above 2) (that is, an SP value at which the swelling degree is maximized) is taken as an SP value of the resin particles.

When the resin particles are, for example, core-shell type particles, it is only required to prepare resin particles of a homopolymer of a monomer having the highest weight ratio in a monomer composition of a polymer constituting a core layer, and to determine an SP value thereof by the above method.

The solubility parameter $SP_2$ of the lubricant can also be measured by a similar method to the above method. Note that the types and number of solvents used for measuring the swelling degree of the lubricant are the same as the types and number of solvents used for measuring the swelling degree of the resin particles.

First, configurations of the ink and the post-treatment liquid will be described, and then an image forming method using the ink and the post-treatment liquid will be described.

1. Ink

The ink according to the present embodiment contains a pigment and resin particles.

1-1. Pigment

The pigment contained in the ink is not particularly limited, but is preferably, for example, an organic pigment or an inorganic pigment of the following number described in Color Index.

Examples of an orange or yellow pigment include C.I. Pigment Orange 31, C.I. Pigment Orange 43, C.I. Pigment Yellow 12, C.I. Pigment Yellow 13, C.I. Pigment Yellow 14, C.I. Pigment Yellow 15, C.I. Pigment Yellow 17, C.I. Pigment Yellow 74, C.I. Pigment Yellow 83, C.I. Pigment Yellow 93, C.I. Pigment Yellow 94, C.I. Pigment Yellow 128, C.I. Pigment Yellow 138, C.I. Pigment Yellow 151, C.I. Pigment Yellow 154, C.I. Pigment Yellow 155, C.I. Pigment Yellow 180, C.I. Pigment Yellow 185, and C.I. Pigment Yellow 213.

Examples of a red or magenta pigment include Pigment Red 3, 5, 19, 22, 31, 38, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 208, 216, 226, and 257, Pigment Violet 3, 19, 23, 29, 30, 37, and 88, and Pigment Orange 13, 16, 20, and 36.

Examples of a blue or cyan pigment include Pigment Blue 1, 15, 15:1, 15:2, 15:3, 15:4, 15:6, 16, 17-1, 22, 27, 28, 29, 36, and 60.

Examples of a green pigment include Pigment Green 7, 26, 36, and 50. Examples of a yellow pigment include Pigment Yellow 1, 3, 12, 13, 14, 17, 34, 35, 37, 55, 74, 81, 83, 93, 94, 95, 97, 108, 109, 110, 137, 138, 139, 153, 154, 155, 157, 166, 167, 168, 180, 185, and 193.

Examples of a black pigment include Pigment Black 7, 28, and 26.

Examples of a commercially available pigment include: Chromofine Yellow 2080, 5900, 5930, AF-1300, and 2700L, Chromofine Orange 3700L and 6730, Chromofine Scarlet 6750, Chromofine Magenta 6880, 6886, 6891N, 6790, and 6887, Chromofine Violet RE, Chromofine Red 6820 and 6830, Chromofine Blue HS-3, 5187, 5108, 5197, 5085N, SR-5020, 5026, 5050, 4920, 4927, 4937, 4824, 4933GN-EP, 4940, 4973, 5205, 5208, 5214, 5221, and 5000P, Chromofine Green 2GN, 2GO, 2G-550D, 5310, 5370, and 6830, Chromofine Black A-1103, Seikafast Yellow 10GH, A-3, 2035, 2054, 2200, 2270, 2300, 2400(B), 2500, 2600, ZAY-260, 2700(B), and 2770, Seikafast Red 8040, C405(F), CA120, LR-116, 1531B, 8060R, 1547, ZAW-262, 1537B, GY, 4R-4016, 3820, 3891, and ZA-215, Seikafast Carmine 6B1476T-7, 1483LT, 3840, and 3na870, Seikafast Bordeaux 10B-430, Seika Light Rose R40, Seika Light Violet B800 and 7805, Seikafast Maroon 460N, Seikafast Orange 900 and 2900, Seika Light Blue C718 and A612, and Cyanine Blue 4933M, 4933GN-EP, 4940, and 4973 (manufactured by Dainichiseika Color & Chemicals Mfg. Co., Ltd.); KET Yellow 401, 402, 403, 404, 405, 406, 416, and 424, KET Orange 501, KET Red 301, 302, 303, 304, 305, 306, 307, 308, 309, 310, 336, 337, 338, and 346, KET Blue 101, 102, 103, 104, 105, 106, 111, 118, and 124, and KET Green 201 (manufactured by Dainippon Ink and Chemicals, Inc.); Colortex Yellow 301, 314, 315, 316, P-624, 314, U10GN, U3GN, UNN, UA-414, and U263, Finecol Yellow T-13 and, T-05, Pigment Yellow 1705, Colortex Orange 202, Colortex Red 101, 103, 115, 116, D3B, P-625, 102, H-1024, 105C, UFN, UCN, UBN, U3BN, URN, UGN, UG276, U456, U457, 105C, and USN, Colortex Maroon 601, Colortex Brown B610N, Colortex Violet 600, Pigment Red 122, Colortex Blue 516, 517, 518, 519, A818, P-908, and 510, Colortex Green 402 and 403, Colortex Black 702 and U905 (manufactured by Sanyo Color Works, Ltd.); Lionol Yellow 1405G, Lionol Blue FG7330, FG7350, FG7400G, FG7405G, ES, and ESP-S (manufactured by Toyo Ink Co., Ltd.), Toner Magenta E02, Permanent Rubin F6B, Toner Yellow HG, Permanent Yellow GG-02, and Hostapeam Blue B2G (manufactured by Hoechst Industry); Novoperm P-HG, Hostaperm Pink E, and Hostaperm Blue B2G (manufactured by Clariant); and Carbon Black #2600, #2400, #2350, #2200, #1000, #990, #980, #970, #960, #950, #850, MCF88, #750, #650, MA600, MA7, MA8, MA11, MA100, MA100R, MA77, #52, #50, #47, #45, #45L, #40, #33, #32, #30, #25, #20, #10, #5, #44, and CF9 (manufactured by Mitsubishi Chemical Corporation).

The pigment is preferably further dispersed with a pigment dispersant from a viewpoint of enhancing dispersibility in the ink. The pigment dispersant will be described later.

The pigment may be a self-dispersible pigment. The self-dispersible pigment is obtained by modifying a surface of a pigment particle with a group having a hydrophilic group, and includes the pigment particle and the group having a hydrophilic group, bonded to a surface of the pigment particle. Examples of the hydrophilic group include a carboxy group, a sulfonate group, and a phosphorus-containing group. Examples of the phosphorus-containing group include a phosphate group, a phosphonate group, a phosphinate group, a phosphite group, and a phosphate group.

Examples of a commercially available self-dispersible pigment include Cab-O-Jet (registered trademark) 200K, 250C, 260M, and 270V (sulfonate group-containing self-dispersible pigment), Cab-O-Jet (registered trademark) 300K (carboxylic acid group-containing self-dispersible pigment), and Cab-O-Jet (registered trademark) 400K, 450C, 465M, 470V, and 480V (phosphate group-containing self-dispersible pigment), manufactured by Cabot Corporation.

The content of the pigment is not particularly limited, but is preferably 0.3 to 12% by mass with respect to the ink from a viewpoint of easily adjusting a viscosity of the ink within a range described later and forming a higher density image. When the content of the pigment is 0.3% by mass or more, a vivid color image is easily obtained. When the content of the pigment is 5% by mass or less, a viscosity of the ink does not become too high, and therefore ejection stability is hardly impaired. The content of the pigment is more preferably 0.5 to 8% by mass with respect to the ink from a similar viewpoint.

1-2. Resin Particles

The resin particles can have a function of fixing a pigment or the like to a fabric. Examples of a resin constituting the resin particles include a (meth)acrylic resin, a polystyrene resin, a polyurethane resin, a polyester resin, and a polyalkylene resin. Among these resins, a resin having a moderately low Tg is preferable from a viewpoint of making it difficult to impair texture of a fabric. Tg of the resin constituting the resin particles is preferably 20° C. or lower, and more preferably −55 to −5° C. Tg of the resin can be determined in accordance with JIS K7121.

Among these resins, a (meth)acrylic resin is preferable from a viewpoint of easily making Tg of the resin moderately low, a viewpoint of friction fastness, and the like. That is, the resin particles preferably contain a (meth)acrylic resin.

((Meth)Acrylic Resin)

The (meth)acrylic resin is a resin obtained by polymerizing a monomer having a (meth)acryloyl group as a main component.

Examples of the monomer having a (meth)acryloyl group include:

(meth)acrylic acid;

a (meth)acrylate (for example, methyl (meth)acrylate, ethyl (meth)acrylate, propyl (meth)acrylate, n-butyl (meth)acrylate, isopropyl (meth)acrylate, isobutyl (meth)acrylate, 2-ethylhexyl (meth)acrylate, 2-hydroxypropyl (meth)acrylate, n-hexyl (meth)acrylate, n-dodecyl (meth)acrylate, n-stearyl (meth)acrylate, or a functional group-containing (meth)acrylate such as phenylethoxy (meth)acrylate, cyclohexyl (meth)acrylate, hydroxyethyl (meth)acrylate, hydroxypropyl (meth)acrylate, benzyl (meth)acrylate, a quaternary ammonium group-containing (meth)acrylate), or glycidyl (meth)acrylate);

a (meth)acrylamide (for example, (meth)acrylamide, (meth)methylacrylamide, (meth)ethylacrylamide, (meth)n-propylacrylamide, N-isopropyl (meth)acrylamide, (meth)butylacrylamide, (meth)cyclohexylacrylamide, (meth)benzylacrylamide, hydroxymethylacrylamide, (meth)methoxymethylacrylamide, butoxymethylacrylamide, methoxyethylacrylamide, (meth)phenylacrylamide, or diacetone acrylamide); and (meth)acrylonitrile.

Examples of a monofunctional monomer which may be copolymerized include, in addition to a monomer having a (meth)acryloyl group, an ethylenically unsaturated carboxylic acid (for example, maleic acid or itaconic acid);

a styrene (for example, styrene, α-methylstyrene, or vinyltoluene);

a saturated fatty acid vinyl (for example, vinyl acetate or vinyl propionate);

a vinyl compound (for example, 1,4-divinyloxybutane or divinylbenzene); and an allyl compound (for example, diallyl phthalate or triallyl cyanurate).

Examples of a di- or higher functional monomer which may be copolymerized include:

a polyfunctional (meth)acrylate such as diethylene glycol di(meth)acrylate, 1,6-hexanediol di(meth)acrylate, propylene glycol di(meth)acrylate, or N,N'-methylenebis(acrylamide); and a polyfunctional acrylamide.

Among these monomers, the monomer having a (meth)acryloyl group preferably contains an alkyl acrylate, more preferably contains a C4 to C12 alkyl acrylate, and still more preferably contains n-butyl acrylate or 2-ethylhexyl acrylate from a viewpoint of lowering Tg of the resin particles. In addition, the monomer having a (meth)acryloyl group preferably contains a methacrylate such as methyl methacrylate or acrylonitrile from a viewpoint of friction resistance. These compounds may be contained singly or in combination of two or more types thereof.

The monomer constituting the (meth)acrylic resin preferably contains a compound (crosslinkable monomer) having a crosslinkable group that reacts with a crosslinking agent contained in the ink or the post-treatment liquid. That is, the (meth)acrylic resin preferably further has a crosslinkable group. The (meth)acrylic resin having a crosslinkable group reacts with the crosslinking agent contained in the ink or the post-treatment liquid and can be post-crosslinked, and therefore can suppress stickiness of a surface of a fabric.

As described above, the crosslinkable monomer only needs to be a polymerizable compound having a crosslinkable group that reacts with a crosslinking agent. For example, when a crosslinking agent that reacts with a hydroxy group is used, examples of the crosslinkable monomer include a monomer having a hydroxy group, and specific examples thereof include hydroxyethyl (meth)acrylate and hydroxypropyl (meth)acrylate. When a crosslinking agent that reacts with a carboxy group is used, examples of the crosslinkable monomer include a monomer having a carboxy group, and specific examples thereof include (meth)acrylic acid and maleic acid. When a crosslinking agent that reacts with a ketone group is used, examples of the crosslinkable monomer include a monomer having a ketone group. Specific examples thereof include diacetone acrylamide (DAAM).

The content of a structural unit derived from the crosslinkable monomer is preferably 0.1 to 30% by mass, and more preferably 1 to 10% by mass with respect to the total structural units constituting the resin. When the content of the structural unit derived from the crosslinkable monomer is equal to or more than the lower limit value, the resin constituting the resin particles can be further post-crosslinked. When the content of the structural unit derived from the crosslinkable monomer is equal to or less than the upper limit value, post-crosslinking hardly becomes excessive. Therefore, wear of a surface of an image-formed product can be further reduced, and friction fastness can be further hardly impaired.

Alternatively, the (meth)acrylic resin may be crosslinked in advance. The crosslinked (meth)acrylic resin can be a copolymer of a polyfunctional vinyl-based monomer and a monofunctional vinyl-based monomer containing at least one of a (meth)acrylate and (meth)acrylonitrile. This is because the crosslinked (meth)acrylic resin is hardly fused when being dried after application of the post-treatment liquid, for example, and is hardly formed into a film.

The resin particle may be a composite particle containing two or more types of resins, for example, a core-shell particle having a core layer and a shell layer. Specifically, the resin particle may have a core layer containing a copolymer of an alkyl acrylate, methyl methacrylate, and a crosslinkable monomer, and a shell layer containing a copolymer of a monomer having a dispersible group, such as an alkyl acrylate, methyl methacrylate, or an ethylenically unsaturated carboxylic acid.

The resin particles can have an average particle size of, for example, 80 to 400 nm, preferably 150 to 300 nm. The average particle size of the resin particles can be measured by a similar method to that for the average particle size of the pigment particles.

The content of the resin particles is preferably 0.1 to 30% by mass, and more preferably 1 to 20% by mass with respect to the ink. When the content of the resin particles is equal to or more than the lower limit value, fixability of the ink to a fabric is more easily enhanced. When the content of the resin particles is equal to or less than the upper limit value, a fabric does not become excessively hard, and texture of the fabric can be further hardly impaired. The resin particles may be used singly or in combination of two or more types thereof.

1-3. Other Components 1-3-1. Crosslinking Agent

As described above, the ink preferably further contains a crosslinking agent for crosslinking the resin constituting the resin particles.

The crosslinking agent is preferably a compound having, in a molecule thereof, at least two functional groups that react with a crosslinkable group (a hydroxy group, a carboxy group, or a ketone group) of the resin particles. Examples of a crosslinking group that reacts with a hydroxy group include an isocyanate group and a blocked isocyanate group. Examples of a crosslinking group that reacts with a carboxy group include an oxazolyl group, an aziridine group, and a carbodiimide group. Examples of a crosslinking group that reacts with a ketone group include a hydrazide group.

Specific examples of a crosslinking agent that reacts with a hydroxy group include Fixer N (blocked isocyanate-based crosslinking agent manufactured by Matsui Dye Chemical Industry Co., Ltd.). Specific examples of a crosslinking agent that reacts with a carboxy group include Fixer F (aziridine-based crosslinking agent manufactured by Matsui Chemical Industry Co., Ltd.). Specific examples of a crosslinking agent that reacts with a ketone group include adipic acid dihydrazide (ADH, hydrazine-based crosslinking agent).

Adipic acid dihydrazide is most preferable, and a combination of adipic acid dihydrazide and diacetone acrylamide (DAAM) which is a crosslinkable monomer that reacts therewith is most preferable from a viewpoint that storage is possible for a long period of time at room temperature and crosslinking is possible at room temperature.

The content of the crosslinking agent in the ink is not particularly limited, but is preferably larger than the content of the crosslinking agent in the post-treatment liquid. As a result, a concentration gradient of the crosslinking agent is easily formed between the ink and the post-treatment liquid. Therefore, a crosslinking density can be lowered as it approaches a surface of an image-formed product. As a result, the surface of the image-formed product does not become too hard, wear of the surface is further reduced, and friction fastness is easily maintained for a longer period of time. When the content of the crosslinking agent in the ink is represented by m1 (parts by mass) and the content of the crosslinking agent in the post-treatment liquid is represented by m2 (parts by mass), m2/m1 is preferably 0.2 to 1. The content m1 of the crosslinking agent in the ink is preferably 0.1 to 3% by mass, and more preferably 0.2 to 2% by mass with respect to the ink.

1-3-2. Solvent

A solvent is not particularly limited, but preferably contains water, and preferably further contains a water-soluble organic solvent.

The content of water is, for example, 20 to 70% by mass, and preferably 30 to 60% by mass with respect to the ink.

The water-soluble organic solvent is not particularly limited as long as the water-soluble organic solvent is compatible with water. However, the water-soluble organic solvent preferably makes the ink hardly thickened by drying from a viewpoint that the ink easily permeates a fabric and from a viewpoint that ejection stability in an inkjet method is hardly impaired. Therefore, the ink preferably contains a high-boiling point solvent having a boiling point of 200° C. or higher.

The high-boiling point solvent having a boiling point of 200° C. or higher only needs to be a water-soluble organic solvent having a boiling point of 200° C. or higher, and is preferably a polyol or a polyalkylene oxide.

Examples of the polyol having a boiling point of 200° C. or higher include: a dihydric alcohol such as 1,3 butanediol (boiling point: 208° C.), 1,6 hexanediol (boiling point: 223° C.), or polypropylene glycol; and a trihydric or higher alcohol such as glycerin (boiling point: 290° C.) or trimethylolpropane (boiling point: 295° C.).

Examples of the polyalkylene oxide having a boiling point of 200° C. or higher include a dihydric alcohol ether such as diethylene glycol monoethyl ether (boiling point: 202° C.), triethylene glycol monomethyl ether (boiling point: 245° C.), tetraethylene glycol monomethyl ether (boiling point: 305° C.), tripropylene glycol monoethyl ether (boiling point: 256° C.), or polypropylene glycol; and a trihydric or higher alcohol ether such as glycerin (boiling point: 290° C.) or hexanetriol.

The solvent may further contain a solvent other than the high-boiling point solvent. Examples of other solvent include a polyhydric alcohol having a boiling point of lower than 200° C. (for example, ethylene glycol, propylene glycol, or hexanetriol); a polyhydric alcohol ether having a boiling point of lower than 200° C. (for example, ethylene glycol monomethyl ether, ethylene glycol monobutyl ether, diethylene glycol monomethyl ether, diethylene glycol dimethyl ether, propylene glycol monomethyl ether, or propylene glycol monoethyl ether; a monohydric alcohol (for example, methanol, ethanol, propanol, pentanol, hexanol, cyclohexanol, or benzyl alcohol); an amine (for example, ethanolamine, N-ethyldiethanolamine, morpholine, N-ethylmorpholine, ethylenediamine, diethylenediamine, or triethylenetetramine); an amide (for example, formamide, N,N-dimethylformamide, or N,N-dimethylacetamide); a heterocycle (for example, 2-pyrrolidone, N-methyl-2-pyrrolidone, N-cyclohexyl-2-pyrrolidone, 2-oxazolidone, or 1,3-dimethyl-2-imidazolidine), a sulfoxide (for example, dimethylsulfoxide); and a sulfone (for example, sulfolane).

The content of the water-soluble organic solvent is, for example, 20 to 70% by mass, and preferably 30 to 60% by mass with respect to the ink.

1-3-3. Other Additives

The ink can further contain another component as necessary. Examples of the other component include a pigment dispersant, a surfactant, an antiseptic agent, an antifungal agent, and a pH adjuster.

(Pigment Dispersant)

The pigment dispersant is present in the ink so as to surround surfaces of the pigment particles, or is adsorbed to the surfaces of the pigment particles to form a pigment dispersion, thereby dispersing the pigment favorably. Such a pigment dispersant is preferably a polymer dispersant from a viewpoint of having excellent dispersibility of the pigment. Examples of the polymer dispersant include an anionic dispersant and a cationic dispersant.

The anionic dispersant can be a polymer dispersant having a hydrophilic group selected from the group consisting of a carboxylic acid group, a phosphorus-containing group, and a sulfonate group. Among these dispersants, a polymer dispersant having a carboxylic acid group is preferable.

Examples of the polymer dispersant having a carboxylic acid group include a polycarboxylic acid and a salt thereof. Examples of the polycarboxylic acid include a (co)polymer of a monomer selected from acrylic acid or a derivative thereof, maleic acid or a derivative thereof, itaconic acid or a derivative thereof, and fumaric acid or a derivative thereof, and a salt thereof. Examples of other monomers constituting the copolymer include styrene and vinyl naphthalene.

An anionic group equivalent of the anionic dispersant is not particularly limited as long as the pigment particles can be sufficiently dispersed, but is preferably, for example, within a range of 1.1 to 3.8 meq/g. When the anionic group equivalent is within the above range, high pigment dispersibility is easily obtained without increasing the molecular weight of the anionic dispersant. The anionic group equivalent can be measured by a similar method to a method for measuring an acid value.

Examples of a cationic group of the cationic dispersant can be a secondary amino group (imino group), a tertiary amino group, and a quaternary ammonium group. The cationic dispersant is not particularly limited as long as the cationic dispersant can form such a pigment dispersion as described above.

The content of the polymer dispersant only needs to be within a range in which the pigment particles are sufficiently dispersed and a viscosity can be adjusted to such an extent that permeability into a fabric is not impaired, and is, for example, 20 to 100% by mass, and preferably 25 to 60% by mass with respect to the pigment.

(Surfactant)

The surfactant can reduce a surface tension of the ink to enhance wettability to a fabric. The type of the surfactant is not particularly limited, but can be, for example, an acetylene glycol-based surfactant, a silicone-based surfactant, or a fluorine-based surfactant.

(Antiseptic Agent or Antifungal Agent)

Examples of the antiseptic agent or the antifungal agent include an aromatic halogen compound (for example, Preventol CMK), methylene dithiocyanate, a halogen-containing nitrogen sulfur compound, and 1,2-benzisothiazolin-3-one (for example, PROXEL GXL).

(pH Adjuster)

Examples of the pH adjuster include citric acid, sodium citrate, hydrochloric acid, and sodium hydroxide.

1-4. Physical Properties of Ink

The viscosity of the ink at 25° C. is not particularly limited as long as an ejection property by an inkjet method is favorable, but is preferably 3 to 20 mPa·s, and more preferably 4 to 12 mPa·s. The viscosity of the ink can be measured by an E-type viscometer at 25° C.

A surface tension of the ink at 25° C. is preferably 36 to 50 mN/m, and more preferably 38 to 45 mN/m. As the surface tension of the ink is smaller, the ink is more easily wet-spread, but capillary permeation hardly occurs (the ink hardly permeates a fabric). When the surface tension of the ink is within the above range, the capillary phenomenon more easily occurs while the ink is further wet-spread. Specifically, only a solvent component such as water can easily permeate a space between fibers, and the resin particles can hardly permeate a space between fibers. As a result, deterioration in texture can be suppressed while friction fastness is maintained. The surface tension of the ink can be easily measured by a plate method (Wilhelmy method).

The surface tension of the ink can be adjusted by, for example, the content of a surfactant, the composition of an organic solvent, and the like.

1-5. Preparation of Ink

The ink can be manufactured by any method. For example, the ink can be manufactured by 1) mixing a pigment, a pigment dispersant, and a solvent to obtain a pigment dispersion, and 2) further mixing the obtained pigment dispersion, a dispersion containing resin particles, and any other component (for example, a crosslinking agent or a surfactant).

2. Post-Treatment Liquid

The post-treatment liquid according to the present embodiment contains a lubricant.

2-1. Lubricant

The lubricant can impart slipperiness to a surface of an image-formed product to enhance friction fastness. As described above, the lubricant only needs to be a lubricant whose ΔSP with the resin particles contained in the ink falls within a predetermined range.

Examples of the lubricant include: a plant/animal-based wax such as a carnauba wax, a candelilla wax, a beeswax, a rice wax, or lanolin; a petroleum-based wax such as a paraffin wax, a microcrystalline wax, a polyolefin wax (for example, a polyethylene wax or a polypropylene wax), an oxidized polyolefin wax (for example, an oxidized polyethylene wax), or petrolatum; a mineral-based wax such as a montan wax or ozokerite; a synthetic wax such as a carbon wax, a Hoechst wax, a polyolefin wax, amide stearate, or an α-olefin-maleic anhydride copolymer; and an organic silicon compound. Among these compounds, an organic silicon compound is preferable from a viewpoint of easily adjusting ΔSP with the resin particles within a predetermined range when the resin particles contained in the ink contain (meth)acrylic resin particles.

The organic silicon compound is preferably a silicone-based resin. The silicone-based resin may be in any of an oil form, a latex form, and a resin form. The silicone-based resin is preferably a silicone acrylic resin.

The silicone acrylic resin is a copolymer containing a siloxane constituent unit and a (meth)acrylate constituent unit.

The content of a structural unit derived from a (meth)acrylate is not particularly limited, but is preferably to 80% by mass, and more preferably 30 to 70% by mass with respect to all the structural units constituting the copolymer. When the content of the structural unit derived from a (meth)acrylate is equal to or more than the lower limit value, ΔSP is moderately reduced easily, for example, when the resin particles contained in the ink are formed of a (meth)acrylic resin. As a result, the lubricant can gradually diffuse to a surface of an image-formed product easily, and favorable friction fastness can be maintained for a long period of time. When the content of the structural unit derived from a (meth)acrylate is equal to or less than the upper limit value, ΔSP is not too small. Therefore, a rate at which the lubricant diffuses to the surface of the image-formed product is not too small, and favorable friction fastness is easily obtained from an initial stage.

Examples of a commercially available silicone-based resin include CHALINE FE502 and CHALINE E-370 (silicone/acrylic polymers manufactured by Nissin Chemical Industry Co., Ltd.) and SYMAC US-450 and SYMAC US-480 (silicone/acrylic polymers manufactured by Toagosei Co., Ltd.).

The content of the lubricant is not particularly limited, but is preferably 0.1 to 10% by mass, and more preferably 0.5 to 5% by mass with respect to the post-treatment liquid. When the content of the lubricant is equal to or more than the lower limit value, slipperiness is more easily imparted to a surface of an image-formed product, and friction fastness can be further enhanced. When the content of the lubricant is equal to or less than the upper limit value, a surface is hardly peeled off, and friction fastness is further hardly impaired.

2-2. Other Components

The post-treatment liquid may further contain a component other than the lubricant as necessary. Examples of other components include resin particles, a crosslinking agent, a solvent (including water), and other additives.

2-2-1. Resin Particles

As the resin particles, those similar to the resin particles used in the ink can be used. The resin particles contained in the post-treatment liquid may be of the same type as or a different type from the resin particles contained in the ink, but are preferably of the same type, and are more preferably (meth)acrylic resin particles from a viewpoint that a continuous layer is more easily formed.

The content of the resin particles in the post-treatment liquid is preferably smaller than the content of the resin particles in the ink. This is because a surface of an image-formed product does not become too hard, and therefore wear can be further reduced, and friction fastness can be further enhanced. When the content of the resin particles in the ink is represented by M1 (parts by mass) and the content of the resin particles in the post-treatment liquid is represented by M2 (parts by mass), M2/M1 is preferably 0.1 to 0.8. Specifically, the content of the resin particles in the post-treatment liquid is, for example, 1 to 20% by mass, and preferably 3 to 8% by mass with respect to the post-treatment liquid. When the content of the resin particles is 1% by mass or more, fixability of the lubricant is more easily enhanced. When the content of the resin particles is 20% by mass or less, a surface of an image-formed product does not become too hard, and therefore wear can be further reduced.

2-2-2. Crosslinking Agent

As the crosslinking agent, those similar to the crosslinking agent used in the ink can be used. As described above, the content m1 of the crosslinking agent in the post-treatment liquid is preferably smaller than the content m2 of the crosslinking agent in the ink. This is because a crosslinking density of the resin particles on a surface of an image-formed product does not become relatively too high, and therefore friction fastness is further hardly impaired. The content m2 of the crosslinking agent in the post-treatment liquid is preferably 0.1 to 3% by mass, and more preferably 0.2 to 2% by mass with respect to the post-treatment liquid.

2-2-3. Solvent and Other Additives

As the solvent and other additives, those similar to the solvent and other additives used in the ink can be used.

2-2-4. Physical Properties

A surface tension of the post-treatment liquid at 25° C. is preferably 32 to 60 mN/m, and more preferably 37 to 50 mN/m from a similar viewpoint to that described above.

The ink and the post-treatment liquid can be used as an ink set.

3 Image Forming Method

An image forming method according to an embodiment of the present invention includes a step of applying an ink onto a fabric by an inkjet method, and a step of applying a post-treatment liquid onto the ink applied to the fabric in a wet-on-wet manner. As the ink and the post-treatment liquid, those described above are used.

3-1. Step of Applying Ink

An ink is discharged from an inkjet recording head to apply ink droplets onto a fabric.

A fiber constituting the fabric is not particularly limited, but examples thereof include: a natural fiber such as cotton (cellulose fiber), hemp, wool, or silk; and a chemical fiber such as rayon, vinylon, nylon, acryl, polyurethane, polyester, or acetate, and blended fibers thereof. Among these fibers, the fabric preferably contains a hydrophilic fiber such as cotton and a hydrophobic fiber such as polyester.

The hydrophobic fiber typified by polyester easily repels liquid, whereas liquid easily permeates the hydrophilic fiber typified by cotton or hemp. By using a mixture of these fibers, water and a solvent preferentially permeate a space between hydrophilic fibers, and as a result, more resin particles gather on the hydrophilic fibers. That is, since minute irregularities are formed on a surface of an image-formed product, friction fastness can be further improved without deteriorating texture.

The fabric may be obtained by forming these fibers into any of a woven fabric, a nonwoven fabric, a knitted fabric, and the like. The fabric may be a blended woven fabric or a blended nonwoven fabric of two or more types of fibers.

3-2. Step of Applying Post-Treatment Liquid

Subsequently, the post-treatment liquid is applied onto the ink applied to the fabric in a wet-on-wet manner.

The application in a wet-on-wet manner is as described above, but is particularly preferably adjusted by time (application interval) from the application of the ink droplets to the application of the post-treatment liquid.

The application interval from the application of the ink droplets to the application of the post-treatment liquid is preferably 0.1 to five seconds when a surface temperature of the fabric is 40° C. or lower, and preferably 30 to 40° C. When the ink droplets are applied, evaporation occurs from a moment at which the ink droplets land on the fabric, the ink droplets permeate the fabric, and a liquid viscosity increases. When the application interval up to the application of the post-treatment liquid is five seconds or less, a difference in viscosity at an interface between the ink and the post-treatment liquid hardly increases. Therefore, the interface is hardly formed, and frictional breakdown at the interface further hardly occurs. When the application interval is 0.1 seconds or more, the ink and the post-treatment liquid are hardly mixed uniformly. Therefore, a concentration gradient of the lubricant is easily formed in a thickness direction, and friction fastness for a long period of time is easily obtained.

The application of the post-treatment liquid is not particularly limited as long as the post-treatment liquid can be applied in the wet-on-wet manner, and may be performed by, for example, either a spray method or an inkjet method.

The adhesion amount of the post-treatment liquid is not particularly limited, but can be preferably 1 to 120 g/m$^2$, and more preferably 10 to 60 g/m$^2$. When the adhesion amount of the post-treatment liquid is within the above range, slipperiness can be further imparted without impairing texture of a fabric, and friction fastness can be further enhanced.

3-3. Other Steps

The image forming method may further include other steps as necessary. For example, a step of pretreating a fabric (pretreatment step) may be performed before the step of applying the ink, or a step of drying the post-treatment liquid or post-crosslinking the resin particles (drying/post-crosslinking step) may be performed after the step of applying the post-treatment liquid.

3-3-1. Regarding Pretreatment Step

In this step, a fabric may be brought into contact with a pretreatment liquid to pretreat the fabric.

The type of the pretreatment liquid is not particularly limited, and can be selected according to the composition of the ink. For example, when the ink contains an anionic dispersant, the pretreatment liquid preferably contains a compound having an acid group or a cationic group. When the ink contains a cationic dispersant, the pretreatment liquid preferably contains a compound having an anionic group.

The compound having a cationic group can act as an aggregating agent that aggregates an ink component. Examples of the compound having a cationic group include a polyvalent metal salt, an organic acid, a cationic resin, and a cationic surfactant. Among these compounds, a polyvalent metal salt, an organic acid, or a cationic resin is preferable, and a polyvalent metal salt or a cationic resin is more preferable from a viewpoint of having excellent reactivity with a pigment or resin particles contained in the ink.

The polyvalent metal salt can be a water-soluble compound having a divalent or higher polyvalent metal ion and an anion that is bonded thereto. Examples of the polyvalent metal ion include a divalent metal ion such as $Ca^{2+}$, $Cu^{2+}$, $Ni^{2+}$, $Mg^{2+}$, $Zn^{2+}$, or $Ba^{2+}$, and a trivalent metal ion such as $Al^{3+}$, $Fe^{3+}$, or $Cr^{3+}$. Examples of the anion include $Cl^-$, $I^-$, $Br^-$, $SO_4^{2-}$, $ClO_3^-$, $NO_3^-$, $HCOO^-$, and $CH_3COO^-$. Among these compounds, a calcium salt and a magnesium salt are preferable, and calcium nitrate and calcium chloride are preferable. Examples of the cationic resin include a cationic urethane resin, a cationic olefin resin, and a cationic allylamine resin.

The compound having an anionic group is not particularly limited, and may be those similar to the anionic surfactant, or may be a polymer compound having an anionic group. Examples of the polymer compound having an anionic group include: a plant skin such as pectinic acid; a cellulose derivative such as carboxymethyl cellulose; a processed starch such as a carboxymethyl starch or a carboxyethyl starch; and a synthetic starch such as an acrylic polymer containing an acrylic acid as a copolymer component, such as an acrylic acid-acrylate copolymer or a styrene-acrylic acid copolymer.

The pretreatment liquid may further contain a pH adjuster an antiseptic agent, and the like as necessary. As the pH adjuster and the antiseptic agent, those similar to the pH adjuster and the antiseptic agent used in the ink can be used.

The adhesion amount of the pretreatment liquid is not particularly limited, but can be, for example, 5 to g/m², and more preferably 20 to 60 g/m².

A method for bringing the fabric into contact with the pretreatment liquid is not particularly limited, but can be, for example, a pad method, a coating method, a spray method, or an inkjet method.

The pretreatment liquid applied to the fabric may be heated and dried using hot air, a hot plate, or a heat roller.

3-3-2. Regarding Drying/Post-Crosslinking Step

In the drying/post-crosslinking step, a solvent or the like contained in the post-treatment liquid applied to the fabric is removed and dried, or the resin constituting the resin particles is crosslinked (post-crosslinked). In particular, when Tg of the resin constituting the resin particles is low, the resin constituting the resin particles is preferably post-crosslinked from a viewpoint of suppressing stickiness.

A drying method is not particularly limited, and may be performed at room temperature or by heating. A heating method may be a method using a heater, a warm air dryer, a heating roller, or the like, and is preferably a method for heating the fabric from both surfaces of the fabric using a warm air dryer and a heater.

3-4. Image-Formed Product

An obtained image-formed product includes the fabric and a continuous layer of the ink and the post-treatment liquid disposed on the fabric. The continuous layer contains a component derived from the ink (pigment particles and resin particles) and a component derived from the post-treatment liquid (lubricant).

In the continuous layer, there is no clear interface between the ink and the post-treatment, and a composition change in a thickness direction is continuous. This state can be observed with, for example, an optical microscope or an electron microscope. For example, the lubricant and the resin particles can be distributed so as to gradually increase from an inner side of the fabric toward a surface side thereof in the thickness direction of the continuous layer. As a result, it is possible to suppress a phenomenon that an entire layer containing the lubricant is peeled off by friction, and therefore friction fastness can be maintained for a long period of time.

When the resin particles are post-crosslinked, a crosslinking density is lower on a surface of the image-formed product than in an inside thereof in the thickness direction of the continuous layer. As a result, a surface of the image-formed product does not become too hard, and therefore wear can be further reduced, and friction fastness is further hardly impaired.

Note that, in the above embodiment, the post-treatment liquid is applied in a wet-on-wet manner, but the ink may be further applied in a wet-on-wet manner. That is, after the pretreatment liquid is applied to the fabric, the ink and the post-treatment liquid may be sequentially applied thereto before the applied pretreatment liquid is completely dried. As a result, the pretreatment liquid, the ink, and the post-treatment liquid can form a continuous layer without a boundary, and therefore fastness typified by friction fastness can be further improved. Also in this case, the time (application interval) from the application of the pretreatment liquid to the application of the ink can be similar to the above.

EXAMPLES

Hereinafter, the present invention will be specifically described with reference to Examples, but the present invention is not limited thereto.

1. Materials of Ink and Post-Treatment Liquid 1-1. Preparation of Anionic Pigment Dispersion With 7 parts by mass of a styrene-butyl acrylate-methacrylic acid copolymer (anionic dispersant, weight average molecular weight: 16000, anionic group equivalent: 3.5 meq/g) as a pigment dispersant, 78 parts by mass of water was mixed, and then the mixture was heated and stirred to prepare a neutralized pigment dispersant. To this mixed liquid, 15 parts by mass of C.I. Pigment Blue 15:3 was added, and the mixture was premixed and then dispersed using a sand grinder filled with 0.5 mm zirconia beads at a volume ratio of 50% to obtain a cyan pigment dispersion having a pigment concentration of 15% by mass.

1-2. Preparation of Resin Particle Dispersion

<Preparation of Resin Particle Dispersion A>

(Preparation of Single Particles)

Into a separable flask equipped with a stirrer, a temperature sensor, a cooling tube, and a nitrogen introduction device, an activator solution obtained by dissolving 1.68 g of an anionic activator (sodium dodecylbenzene sulfonate: SDS) and 0.34 g of sodium carbonate in 320 g of deionized water in advance was put, and the internal temperature was raised to 80° C. while the mixture was stirrer at a stirring speed of 330 rpm under a nitrogen stream.

Meanwhile, 70 parts by mass of n-butyl acrylate (BA), 15 parts by mass of methyl methacrylate (MMA), parts by mass of methacrylic acid, 5 parts by mass of diacetone acrylamide (DAAM) as a crosslinkable monomer, and 0.005 parts by mass of 1-octanethiol (NOM) as a water-soluble chain transfer agent were dissolved to prepare a monomer solution.

Subsequently, a solution in which 0.14 g (0.001 parts by mass) of a polymerization initiator (potassium persulfate: KPS) was dissolved in 2.66 g of deionized water was added, the mixture was heated at 80° C., and the prepared monomer solution was dropwise added over 60 minutes and stirred to prepare a resin particle dispersion A containing copolymer particles (BA/MMA/MAA/DAAM=70/15/10/5 mass ratio) and having a solid content concentration of 30%.

(Solubility Parameter $SP_1$ of Resin Particles)

The solubility parameter $SP_1$ of the resin particles was measured by the following procedure.

1) The swelling degree of the resin particles was measured when the resin particles were immersed in each of hexane (solubility parameter 7.24), toluene (solubility parameter 8.91), ethyl acetate (solubility parameter 9.10), acetone (solubility parameter 9.77), and methanol (solubility parameter 14.28).

The swelling degree (%) was calculated by the following formula in which W1 represents the weight of the dry resin particles, and W2 represents the weight of the resin particles after the resin particles were immersed in each of the 100% solvents at room temperature for 120 minutes.

$$\text{Swelling degree (\%)}=(W2-W1)/W1\times100$$

2) Subsequently, a graph was created in which an X axis represents an SP value of a solvent and a Y axis represents a swelling degree, and an approximate curve was obtained by Gaussian approximation (normal distribution approximation). As an SP value of a solvent, a value of "Fundamentals and Engineering of Coating, written by Yuji Harasaki, p. 53, Converting Technical Institute, 2010" was used.

3) Subsequently, a vertex of the approximate curve obtained in the above 2) (an SP value of a solvent at which the swelling degree is maximized) was taken as an SP value of the resin particles.

The $SP_1$ value measured by the above method was 9.1, and Tg of the resin particles was −18° C.

<Preparation of Resin Particle Dispersion B>
(Preparation of Core Particles)

Into a separable flask equipped with a stirrer, a temperature sensor, a cooling tube, and a nitrogen introduction device, an activator solution obtained by dissolving 1.68 g of an anionic activator (sodium dodecylbenzene sulfonate: SDS) and 0.52 g of sodium carbonate in 320 g of deionized water in advance was put, and the internal temperature was raised to 80° C. while the mixture was stirrer at a stirring speed of 330 rpm under a nitrogen stream.

Meanwhile, 70 parts by mass of n-butyl acrylate (BA), 10 parts by mass of methyl methacrylate (MMA), parts by mass of hydroxyethyl methacrylate (HEMA), 5 parts by mass of diacetone acrylamide (DAAM) as a crosslinkable monomer, and 0.004 parts by mass of 1-octanethiol (NOM) as a water-soluble chain transfer agent were dissolved to prepare a monomer solution.

Subsequently, a solution in which 0.14 g (0.001 parts by mass) of a polymerization initiator (potassium persulfate: KPS) was dissolved in 2.66 g of deionized water was added, the mixture was heated at 80° C., and the prepared monomer solution was dropwise added over 60 minutes and stirred to prepare core particles (BA/MMA/HEMA/DAAM=65/15/15/5 mass ratio).

Note that the amount of the core layer was larger than the amount of the shell layer. Therefore, only the core particles of the resin particles were separately prepared, and the $SP_1$ value thereof was measured and found to be 9.4.

<Preparation of Resin Particle Dispersion C>

A resin particle dispersion C was prepared in a similar manner to the preparation of the resin particle dispersion B except that copolymer particles of n-butyl methacrylate (BMA)/2-ethylhexyl acrylate/diacetone acrylamide (DAAM)=60/35/5 (mass ratio) were prepared by changing the type and amount of a monomer to be used for preparation. Similarly, the core particles were separately synthesized, and the solubility parameter $SP_1$ thereof was measured. As a result, $SP_1$ was 8.6, and Tg was −8° C.

<Resin Particle Dispersion D>

A resin particle dispersion D was prepared by the same method as the resin particle dispersion A except that 60 parts by mass of n-butyl acrylate (BA), 10 parts by mass of methyl methacrylate (MMA), 20 parts by mass of hydroxyethyl methacrylate (HEMA), 5 parts by mass of methacrylic acid, and 0.004 parts by mass of 1-octanethiol (NOM) as a water-soluble chain transfer agent were dissolved to prepare a monomer solution. $SP_1$ was 9.8, and Tg was −14° C.

<Resin Particle Dispersion E>

Elitel KT-0507 (polyester particle dispersion) manufactured by Unitika Corporation. $SP_1$ was 10.0.

1-3. Crosslinking Agent

Adipic acid dihydrazide (ADH, water-soluble crosslinking agent)

Fixer F (aziridine-based crosslinking agent, manufactured by Matsui Dye Chemical Industry Co., Ltd.)

Fixer N (blocked isocyanate-based crosslinking agent, manufactured by Matsui Dye Chemical Industry Co., Ltd.)

1-4. Lubricant

Lubricant 1: CHALINE FE502 (silicone-acrylic polymer manufactured by Nissin Chemical Industry Co., Ltd., silicone/acrylic=5/5 mass ratio, SP value: 8.4)

Lubricant 2: CHALINE R-170BX (silicone-acrylic polymer manufactured by Nissin Chemical Industry Co., Ltd., silicone/acrylic=3/7 mass ratio, SP value: 8.7)

Lubricant 3: paraffin wax (SP value 8.1)

Lubricant 4: polyethylene wax (SP value 8.0)

Lubricant 5: silicone wax (SP value 7.5)

1-5. Organic Solvent

Ethylene glycol

Propylene glycol

Glycerin 1-6. Other Components

OLFIN E1010 (acetylene glycol-based surfactant manufactured by Nissin Chemical Industry Co., Ltd.): parts by mass Proxel GXL (antifungal agent manufactured by Lonza Japan): 0.5 parts by mass 2. Preparation of Ink <Preparation of Ink 1>

Subsequently, the following components were mixed such that a total amount was 100 parts by mass to obtain an ink 1.

Anionic pigment dispersion (pigment concentration: 15% by mass): 10 parts by mass (solid content: 1.5 parts by mass)

Resin particle dispersion A (solid content concentration: 30% by mass): 35 parts by mass (solid content: parts by mass)

Adipic acid dihydrazide (crosslinking agent): 0.7 parts by mass

Ethylene glycol: 25 parts by mass

Propylene glycol: 10 parts by mass

Glycerin: 10 parts by mass

OLFIN E1010 (acetylene glycol-based surfactant manufactured by Nissin Chemical Industry Co., Ltd.): parts by mass Proxel GXL (antifungal agent manufactured by Lonza Japan): 0.5 parts by mass Deionized water balance <Preparation of Inks 2 to 13>

Inks 2 to 13 were prepared in a similar manner to the ink 1 except that some of the constituent components of the ink 1 were changed as presented in Table 1.

<Measurement>

SP values of the resin particles used for preparing the inks 1 to 13 and surface tensions of the inks were calculated or measured by the following methods.

(Measurement of Surface Tension)

The surface tensions of the inks were measured by a plate method (Wilhelmy method) at 25° C.

Measurement results of the inks 1 to 13 are presented in Table 1.

TABLE 1

| Ink | Dispersion | Resin particles Content M1 (parts by mass) | $SP_1$ $(cal/cm^3)^{1/2}$ | Crosslinking agent Type | Content m1 (parts by mass) | Content of surfactant (parts by mass) | Solvent composition EG/PG/Gly | Surface tension (mN/m) |
|---|---|---|---|---|---|---|---|---|
| 1 | A | 10.5 | 9.1 | ADH | 0.7 | 0.1 | 25/10/10 | 38 |
| 2 | A | | 9.1 | Fixer N | 0.7 | 0.1 | 20/15/10 | 37 |
| 3 | A | | 9.1 | Fixer F | 0.7 | 0.1 | 25/10/10 | 36 |
| 4 | A | | 9.1 | ADH | 0.7 | 0.02 | 25/10/10 | 41 |
| 5 | A | | 9.1 | ADH | 0.7 | 0.2 | 25/10/10 | 36 |
| 6 | A | | 9.1 | ADH | 0.7 | 0.3 | 30/10/5 | 35 |
| 7 | A | | 9.1 | ADH | 0.7 | 0.5 | 25/10/10 | 33 |
| 8 | A | | 9.1 | ADH | 0.7 | 0.1 | 25/10/10 | 38 |
| 9 | B | | 9.4 | ADH | 0.7 | 0.1 | 20/10/10 | 39 |
| 10 | D | | 9.8 | Fixer F | 0.7 | 0.1 | 25/10/10 | 38 |
| 11 | A | | 9.1 | — | 0 | 0.1 | 25/10/10 | 39 |
| 12 | C | | 8.6 | Fixer F | 0.7 | 0.1 | 20/10/15 | 38 |
| 13 | E | | 10 | Fixer F | 0.7 | 0.1 | 25/10/10 | 36 |

3. Preparation of Post-Treatment Liquid

<Preparation of Post-Treatment Liquid 1>

Subsequently, the following components were mixed such that a total amount was 100 parts by mass to obtain a post-treatment liquid 1.

Resin particle dispersion A (solid content concentration: 30% by mass): 16.7 parts by mass (solid content: parts by mass)

Adipic acid dihydrazide (crosslinking agent): 0.2 parts by mass

Lubricant 1: 1.5 parts by mass

Ethylene glycol: 25 parts by mass

Propylene glycol: 10 parts by mass

Glycerin: 15 parts by mass

OLFIN E1010 (acetylene glycol-based surfactant manufactured by Nissin Chemical Industry Co., Ltd.): parts by mass Proxel GXL (antifungal agent manufactured by Lonza Japan): 0.5 parts by mass Deionized water balance <Preparation of Post-Treatment Liquids 2 to 16>

Post-treatment liquids 2 to 16 were prepared in a similar manner to the post-treatment liquid 1 except that the composition of the post-treatment liquid 1 was changed as presented in Table 2.

<Measurement>

Surface tensions of the post-treatment liquids 1 to 16 were measured by a similar method to the above method. In addition, the solubility parameter $SP_2$ of each of the lubricants used for preparing the post-treatment liquids was also determined by the same method as the solubility parameter $SP_1$ of the resin particles. Note that the types and number of solvents used for measuring the swelling degree of the lubricant were the same as the types and number of solvents used for measuring the swelling degree of the resin particles.

Measurement results of the post-treatment liquids 1 to 16 are presented in Table 2.

TABLE 2

| Post-treatment liquid | Resin particles Dispersion | $SP_3$ $(cal/cm^3)^{1/2}$ | Content M2 (parts by mass) | Lubricant Type | $SP_2$ $(cal/cm^3)^{1/2}$ | Content (parts by mass) | Crosslinking agent Type | Content m2 (parts by mass) | Content of surfactant (parts by mass) | Solvent composition EG/PG/Gly | Surface tension (mN/m) |
|---|---|---|---|---|---|---|---|---|---|---|---|
| 1 | A | 9.1 | 5.0 | Lubricant 1 | 8.4 | 1.5 | ADH | 0.2 | 0.1 | 25/10/15 | 39 |
| 2 | A | 9.1 | 5.0 | Lubricant 1 | 8.4 | 1.5 | Fixer N | 0.2 | 0.05 | 25/10/15 | 41 |
| 3 | A | 9.1 | 5.0 | Lubricant 1 | 8.4 | 1.5 | Fixer F | 0.2 | 0.1 | 25/10/15 | 38 |
| 4 | B | 9.4 | 5.0 | Lubricant 1 | 8.4 | 1.5 | ADH | 0.2 | 0.1 | 30/5/10 | 39 |
| 5 | D | 9.8 | 5.0 | Lubricant 1 | 8.4 | 1.5 | ADH | 0.2 | 0.1 | 25/10/15 | 39 |
| 6 | A | 9.1 | 5.0 | Lubricant 1 | 8.4 | 0.5 | ADH | 0.2 | 0.1 | 25/10/15 | 39 |
| 7 | A | 9.1 | 5.0 | Lubricant 1 | 8.4 | 5 | ADH | 0.2 | 0.1 | 25/10/15 | 39 |
| 8 | A | 9.1 | 5.0 | | — | | ADH | 0.2 | 0.1 | 25/10/15 | 39 |
| 9 | A | 9.1 | 5.0 | Lubricant 1 | 8.4 | 1.5 | ADH | 0.5 | 0.2 | 25/10/15 | 37 |
| 10 | A | 9.1 | 5.0 | Lubricant 1 | 8.4 | 1.5 | ADH | 0.7 | 0.1 | 20/5/15 | 39 |
| 11 | A | 9.1 | 5.0 | Lubricant 2 | 8.7 | 1.5 | ADH | 0.7 | 0.1 | 25/10/15 | 39 |
| 12 | A | 9.1 | 5.0 | Lubricant 3 | 8.1 | 1.5 | ADH | 0.2 | 0.1 | 25/10/15 | 39 |
| 13 | A | 9.1 | 5.0 | Lubricant 4 | 8.0 | 1.5 | ADH | 0.2 | 0.3 | 25/10/15 | 36 |
| 14 | A | 9.1 | 5.0 | Lubricant 5 | 7.5 | 1.5 | ADH | 0.2 | 0.1 | 20/5/10 | 39 |
| 15 | A | 9.1 | 5.0 | Lubricant 2 | 8.7 | 1.5 | ADH | 0.2 | 0.1 | 25/10/15 | 39 |
| 16 | A | 9.1 | 5.0 | Lubricant 2 | 8.7 | 1.5 | Fixer F | 0.2 | 0.1 | 25/10/15 | 39 |

4. Preparation of Pretreatment Liquid

The following components were mixed such that a total amount was 100 parts by mass to obtain a pretreatment liquid.

PAS-H-1L (polydiallyldimethylammonium chloride manufactured by Nittobo Medical Co., Ltd., cationizing agent): 5 parts by mass Ethylene glycol: 20 parts by mass Propylene glycol: 10 parts by mass Glycerin: 15 parts by mass OLFIN E1010 (acetylene glycol-based surfactant manufactured by Nissin Chemical Industry Co., Ltd.): 0.1 parts by mass Proxel GXL (antifungal agent manufactured by Lonza Japan): 0.5 parts by mass Deionized water balance 5. Image Formation Test and Evaluation <Tests 1, 3 to 18, and 20 to 27>

(Image Forming Test)

As a fabric, a TC broad (polyester/cotton=75%/25% blended fabric) was prepared. Subsequently, an image forming test was performed using the pretreatment liquid, the inks, and the post-treatment liquids prepared above.

First, an inkjet head (Konica Minolta head #204) was prepared as an image forming apparatus. The head includes a pretreatment liquid head, an ink head, and a post-treatment liquid head. Then, the pretreatment liquid, each of the inks described in Table 3, and each of the post-treatment liquids, prepared above, were set such that they could be discharged from the heads, respectively, and the pretreatment liquid, the ink, and the post-treatment liquid were superimposed in this order on the fabric to prepare a sample that had been subjected to solid textile printing. During the application, a surface temperature of the fabric was adjusted to 25° C. Application conditions were as follows.

The pretreatment agent and the ink of each color were discharged at 540 dpi in main scanning×720 dpi in sub scanning. Note that dpi represents the number of ink droplets (dots) per 2.54 cm. A discharge frequency was 22.4 kHz.

The post-treatment liquid was applied in a wet-on-wet manner. Specifically, an application interval from the discharge of the ink droplets to the discharge of the post-treatment liquid was set to 0.2 seconds. At this time, (residual amount of ink at the time of applying post-treatment liquid)/(adhesion amount of ink) was 0.8 per unit area of a recording region. The post-treatment liquid was discharged under such a condition that an adhesion amount of the post-treatment liquid was 15 g/m².

Then, the fabric to which the post-treatment liquid had been applied was dried and post-crosslinked at 120° C. for three minutes in a belt conveyance type dryer to obtain an image-formed product.

<Test 2>

An image-formed product was obtained in a similar manner to test 1 except that after application of the pretreatment liquid, the ink droplets and the post-treatment liquid droplets were simultaneously discharged (the application interval was set to 0 second).

<Test 19>

An image-formed product was obtained in a similar manner to test 1 except that after application of the ink droplets, the ink droplets were heated with an infrared heater to dry a volatile component of the applied ink, and then the post-treatment liquid droplets were applied (applied in a wet-on-dry manner).

<Evaluation>

Dry friction fastness and texture of the obtained image-formed product were evaluated by the following methods.

(Texture)

The obtained image-formed product was subjected to sensory evaluation by being touched with a hand, and evaluated according to the following criteria.

○: Soft, and a boundary between a printed surface and a fabric is not found.

Δ: Not stiff and soft, but a boundary between a printed surface and a fabric is found.

x: Stiff and firm feel

If an image-formed product was evaluated to be Δ or higher, the image-formed product was evaluated to be within an acceptable range.

(Friction Fastness)

The obtained image-formed product was left for one month under conditions of 25° C. and 50% RH with a xenon lamp (super xenon weather meter SX75, Suga Test Instruments Co., Ltd.). Thereafter, 100.0 reciprocations were performed under a load of 200.0 g and a speed condition of 10.0 cm/s using a Gakushin type friction fastness tester (product name: AB-301, manufactured by Tester Sangyo Co., Ltd.). Thereafter, pure water was impregnated into a white cloth for JIS dye fastness test (type 3-1 in accordance with JIS L 0803: 2011), a dye transfer density optical density value (hereinafter, also referred to as "dye transfer density OD value") was measured, and friction fastness was evaluated according to the following evaluation criteria. The lower the dye transfer density OD value, the better the friction fastness (wet friction fastness).

⊙: The dye transfer density OD value is 0.15 or less.

○: The dye transfer density OD value is more than 0.15 and 0.20 or less.

Δ: The dye transfer density OD value is more than 0.20 and 0.25 or less.

x: The dye transfer density OD value is more than 0.25.

If an image-formed product was evaluated to be Δ or higher, the image-formed product was evaluated to be within an acceptable range.

Evaluation results of tests 1 to 29 are presented in Table 3.

TABLE 3

| | Ink | | | | | | Post-treatment liquid | | | | |
|---|---|---|---|---|---|---|---|---|---|---|---|
| Test No. | Type | Resin particle dispersion | $SP_1$ $(cal/cm^3)^{1/2}$ | Cross-linking agent | Content m1 of cross-linking agent (parts by mass) | Surface tension (mN/m) | Type | Resin particle dispersion | $SP_3$ $(cal/cm^3)^{1/2}$ | Lubricant | $SP_2$ $(cal/cm^3)^{1/2}$ |
| 1 | 1 | A | 9.1 | ADH | 0.7 | 38 | 1 | A | 9.1 | Lubricant 1 | 8.4 |
| 2 | 2 | A | 9.1 | Fixer N | 0.7 | 37 | 2 | A | 9.1 | Lubricant 1 | 8.4 |
| 3 | 3 | A | 9.1 | Fixer F | 0.7 | 36 | 3 | A | 9.1 | Lubricant 1 | 8.4 |

TABLE 3-continued

| Test No. | | | | | | | | | | | | |
|---|---|---|---|---|---|---|---|---|---|---|---|---|
| 4 | 3 | A | 9.1 | Fixer F | 0.7 | 37 | 1 | A | 9.1 | Lubricant 1 | 8.4 |
| 5 | 1 | A | 9.1 | ADH | 0.7 | 38 | 1 | A | 9.1 | Lubricant 1 | 8.4 |
| 6 | 1 | A | 9.1 | ADH | 0.7 | 38 | 4 | B | 9.4 | Lubricant 1 | 8.4 |
| 7 | 1 | A | 9.1 | ADH | 0.7 | 38 | 5 | D | 9.8 | Lubricant 1 | 8.4 |
| 8 | 1 | A | 9.1 | ADH | 0.7 | 38 | 6 | A | 9.1 | Lubricant 1 | 8.4 |
| 9 | 1 | A | 9.1 | ADH | 0.7 | 38 | 7 | A | 9.1 | Lubricant 1 | 8.4 |
| 10 | 1 | A | 9.1 | ADH | 0.7 | 38 | 8 | A | 9.1 | — | 8.4 |
| 11 | 4 | A | 9.1 | ADH | 0.7 | 41 | 1 | A | 9.1 | Lubricant 1 | 8.4 |
| 12 | 5 | A | 9.1 | ADH | 0.7 | 36 | 1 | A | 9.1 | Lubricant 1 | 84 |
| 13 | 6 | A | 9.1 | ADH | 0.7 | 35 | 1 | A | 9.1 | Lubricant 1 | 8.4 |
| 14 | 7 | A | 9.1 | ADH | 0.7 | 33 | 1 | A | 9.1 | Lubricant 1 | 8.4 |
| 15 | 11 | A | 9.1 | — | 0 | 38 | 1 | A | 9.1 | Lubricant 1 | 8.4 |
| 16 | 1 | A | 9.1 | ADH | 0.7 | 38 | 8 | A | 9.1 | Lubricant 1 | 8.4 |
| 17 | 11 | A | 9.1 | — | 0 | 38 | 8 | A | 9.1 | Lubricant 1 | 8.4 |
| 18 | 1 | A | 9.1 | ADH | 0.7 | 38 | 9 | A | 9.1 | Lubricant 1 | 8.4 |
| 19 | 8 | A | 9.1 | ADH | 0.2 | 38 | 10 | A | 9.1 | Lubricant 1 | 8.4 |
| 20 | 1 | A | 9.1 | ADH | 0.7 | 38 | 11 | A | 9.1 | Lubricant 2 | 8.7 |
| 21 | 1 | A | 9.1 | ADH | 0.7 | 38 | 1 | A | 9.1 | Lubricant 1 | 8.4 |
| 22 | 1 | A | 9.1 | ADH | 0.7 | 38 | 12 | A | 9.1 | Lubricant 3 | 8.1 |
| 23 | 1 | A | 9.1 | ADH | 0.7 | 38 | 13 | A | 9.1 | Lubricant 4 | 8.0 |
| 24 | 1 | A | 9.1 | ADH | 0.7 | 38 | 14 | A | 9.1 | Lubricant 5 | 7.5 |
| 25 | 9 | B | 9.4 | ADH | 0.7 | 38 | 15 | A | 9.1 | Lubricant 2 | 8.7 |
| 26 | 9 | B | 9.4 | ADH | 0.7 | 38 | 12 | A | 9.1 | Lubricant 3 | 8.1 |
| 27 | 12 | C | 8.6 | ADH | 0.7 | 38 | 13 | A | 9.1 | Lubricant 1 | 8.4 |
| 28 | 10 | D | 9.8 | Fixer F | 0.7 | 38 | 16 | A | 9.1 | Lubricant 1 | 8.4 |
| 29 | 13 | E | 10 | Fixer F | 0.7 | 36 | 16 | A | 9.1 | Lubricant 1 | 8.4 |

| | Post-treatment liquid | | | | Process condition* | | | Friction fastness | | |
|---|---|---|---|---|---|---|---|---|---|---|
| Test No. | Cross-linking agent | Content m2 of cross-linking agent (parts by mass) | Surface tension (mN/m) | $SP_1 - SP_2$ | wet on wet | Application interval (seconds) | Texture | Short period of time | Long period of time | Note |
| 1 | ADH | 0.2 | 39 | 0.7 | Applied | 0.2 | ○ | ○ | ⊙ | Example |
| 2 | Fixer N | 0.2 | 38 | 0.7 | | 0.2 | ○ | Δ | ○ | Example |
| 3 | Fixer F | 0.2 | 38 | 0.7 | | 0.2 | ○ | Δ | ○ | Example |
| 4 | ADH | 0.2 | 39 | 0.7 | | 0.2 | ○ | Δ | ○ | Example |
| 5 | ADH | 0.2 | 39 | 0.7 | | 0 | Δ | Δ | Δ | Example |
| 6 | ADH | 0.2 | 39 | 0.7 | | 0.2 | ○ | Δ | ⊙ | Example |
| 7 | ADH | 0.2 | 39 | 0.7 | | 0.2 | ○ | Δ | ⊙ | Example |
| 8 | ADH | 0.2 | 39 | 0.7 | | 0.2 | ○ | Δ | ⊙ | Example |
| 9 | ADH | 0.2 | 39 | 0.7 | | 0.2 | ○ | ○ | ⊙ | Example |
| 10 | ADH | 0.2 | 39 | 0.7 | | 0.2 | ○ | X | X | Comparative Example |
| 11 | ADH | 0.2 | 41 | 0.7 | | 0.2 | ○ | ○ | ⊙ | Example |
| 12 | ADH | 0.2 | 36 | 0.7 | | 0.2 | ○ | ○ | ⊙ | Example |
| 13 | ADH | 0.2 | 35 | 0.7 | | 0.2 | Δ | ○ | ⊙ | Example |
| 14 | ADH | 0.2 | 33 | 0.7 | | 0.2 | Δ | ○ | Δ | Example |
| 15 | ADH | 0.3 | 39 | 0.7 | Applied | 0.2 | ○ | Δ | Δ | Example |
| 16 | — | 0 | 39 | 0.7 | | 0.2 | ○ | Δ | Δ | Example |
| 17 | — | 0 | 39 | 0.7 | | 0.2 | ○ | Δ | Δ | Example |
| 18 | ADH | 0.5 | 39 | 0.7 | | 0.2 | ○ | Δ | ○ | Example |
| 19 | ADH | 0.7 | 39 | 0.7 | | 0.2 | ○ | Δ | Δ | Example |
| 20 | ADH | 0.7 | 39 | 0.4 | | 0.2 | ○ | ○ | ⊙ | Example |
| 21 | ADH | 0.2 | 39 | 0.7 | Not applied | | X | X | X | Comparative Example |
| 22 | ADH | 0.2 | 39 | 1.0 | Applied | 0.2 | ○ | ○ | X | Comparative Example |
| 23 | ADH | 0.2 | 39 | 1.1 | | 0.2 | ○ | ○ | X | Comparative Example |
| 24 | ADH | 0.2 | 39 | 1.6 | | 0.2 | ○ | ○ | X | Comparative Example |
| 25 | ADH | 0.2 | 39 | 0.7 | | 0.2 | ○ | ○ | ⊙ | Example |
| 26 | ADH | 0.2 | 39 | 1.3 | | 0.2 | ○ | ○ | X | Comparative Example |
| 27 | ADH | 0.2 | 39 | 0.2 | | 0.2 | ○ | ○ | X | Comparative Example |
| 28 | Fixer F | 0.2 | 39 | 1.4 | | 0.2 | X | ○ | Δ | Comparative Example |
| 29 | Fixer F | 0.2 | 39 | 1.6 | | 0.2 | X | ○ | X | Comparative Example |

*Process condition from application of ink to application of post-treatment liquid As presented in Table 3, in tests 1 to 9 and 11 to 21 in which the post-treatment liquid was applied in a wet-on-wet manner and the difference ΔSP between the SP value of the resin particles in the ink and the SP value of the lubricant in the post-treatment liquid was 0.3 to 0.8, it is found that an image-formed product having high dry friction durability for a long period of time can be obtained while favorable texture is maintained.

Meanwhile, in test 21 in which the post-treatment liquid was applied in a wet-on-dry manner, it is found that both the dry friction fastness and the texture are low. In tests 22 to 24, 26, 28, and 29 in which the difference ΔSP between the SP value of the resin particles in the ink and the SP value of the lubricant in the post-treatment liquid exceeded 0.8 even when the post-treatment liquid was applied in a wet-on-wet manner, it is found that dry friction durability for a long period of time is low. Also in test 27 in which the difference ΔSP between the SP value of the resin particles in the ink and the SP value of the lubricant in the post-treatment liquid was smaller than it is found that friction durability for a long period of time is low.

<Tests 30 to 34>

Image formation was performed in a similar manner to test 1 except that the interval of the application time from the discharge of the ink droplets to the start of the discharge of the post-treatment liquid was changed as presented in Table 4.

Then, similar evaluation to the above (dry friction fastness and texture) was performed. Results thereof are presented in Table 4.

TABLE 4

| | Ink | | | Post-treatment liquid | | | | Manufacturing condition | | | Friction fastness | | |
|---|---|---|---|---|---|---|---|---|---|---|---|---|---|
| Test No. | Type | Resin particle dispersion | $SP_1$ $(cal/cm^3)^{1/2}$ | Type | Resin particle dispersion | Lubricant | $SP_2$ $(cal/cm^3)^{1/2}$ | $SP_1 - SP_2$ | Heating drying | Application interval (seconds) | Texture | Short period of time | Long period of time | Note |
| 1 | 1 | A | 9.1 | 1 | A | Lubricant 1 | 8.4 | 0.7 | Not performed | 0.2 | ○ | ○ | ⊙ | Example |
| 5 | | | | | | | | | | 0 | Δ | Δ | Δ | Example |
| 30 | | | | | | | | | | 0.05 | Δ | ○ | Δ | Example |
| 31 | | | | | | | | | | 0.1 | ○ | ○ | Δ | Example |
| 32 | | | | | | | | | | 1 | ○ | ○ | ○ | Example |
| 33 | | | | | | | | | | 5 | ○ | ○ | Δ | Example |
| 34 | | | | | | | | | | 6 | ○ | Δ | Δ | Example |

As presented in Table 4, it is found that by setting the application interval to 0.1 to five seconds, the texture of the fabric is further hardly impaired, and the friction fastness is further improved.

According to an embodiment of the present invention, it is possible to provide an image forming method capable of maintaining high friction fastness for a long period of time without impairing texture of a fabric.

Although embodiments of the present invention have been described and illustrated in detail, the disclosed embodiments are made for purposes of illustration and example only and not limitation. The scope of the present invention should be interpreted by terms of the appended claims

What is claimed is:

1. An image forming method comprising:
    applying an ink containing a pigment and resin particles onto a fabric by an inkjet method; and
    applying a post-treatment liquid containing a lubricant onto the ink applied to the fabric in a wet-on-wet manner, wherein
    when a solubility parameter of a resin constituting the resin particles is represented by $SP_1$ $(cal/cm^3)^{1/2}$ and a solubility parameter of the lubricant is represented by $SP_2$ $(cal/cm^3)^{1/2}$, $0.3 \leq SP_1 - SP_2 \leq 0.8$ is satisfied.

2. The image forming method according to claim 1, wherein
    the resin particles contain a (meth)acrylic resin.

3. The image forming method according to claim 2, wherein
    the (meth)acrylic resin further has a crosslinkable group, and
    at least one of the ink and the post-treatment liquid contains a crosslinking agent that reacts with the crosslinkable group.

4. The image forming method according to claim 3, wherein
    a content mass of the crosslinking agent in the ink is larger than a content mass of the crosslinking agent in the post-treatment liquid.

5. The image forming method according to claim 1, wherein
    the lubricant contains a silicone-based resin.

6. The image forming method according to claim 5, wherein
    the silicone-based resin is a silicone acrylic copolymer.

7. The image forming method according to claim 1, wherein
    a surface tension of each of the ink and the post-treatment liquid at 25° C. is 36 to 50 mN/m.

8. The image forming method according to claim 1, wherein
    in a state where a surface temperature of the fabric is 40° C. or lower, a time from application of the ink to start of application of the post-treatment liquid is 0.1 to five seconds.

9. The image forming method according to claim 1, wherein
    the fabric contains a hydrophobic fiber and a hydrophilic fiber.

10. An ink set for inkjet textile printing, comprising:
    an ink containing a pigment and resin particles; and
    a post-treatment liquid containing a lubricant, wherein
    when a solubility parameter of a resin constituting the resin particles is represented by $SP_1$ $(cal/cm^3)^{1/2}$ and a solubility parameter of the lubricant is represented by $SP_2$ $(cal/cm^3)^{1/2}$, $0.3 \leq SP_1 - SP_2 \leq 0.8$ is satisfied, and
    a surface tension of each of the ink and the post-treatment liquid at 25° C. is 36 to 50 mN/m.

11. The ink set according to claim 10, wherein the resin particles contain a (meth)acrylic resin, and the lubricant contains a silicone acrylic copolymer.

12. The image forming method according to claim 1, wherein the step of applying a post-treatment liquid containing a lubricant onto the ink applied to the fabric in a wet-on-wet manner includes applying the post-treatment liquid when the following is satisfied:

(an amount of liquid ink remaining without being dried when the post-treatment liquid is applied)/(the adhesion amount of the ink) is 0.4 to 1.0.

13. The image forming method according to claim 1, wherein the lubricant of the post treatment liquid contains a silicone-based resin, and the post-treatment liquid further includes an acrylic resin.

* * * * *